United States Patent
Ohara

(10) Patent No.: US 9,519,959 B2
(45) Date of Patent: Dec. 13, 2016

(54) IMAGE PROCESSING APPARATUS, IMAGING APPARATUS, AND METHOD FOR PROCESSING IMAGE

(71) Applicant: SOCIONEXT INC., Yokohama-shi, Kanagawa (JP)

(72) Inventor: Kunihiro Ohara, Tajimi (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/694,593

(22) Filed: Apr. 23, 2015

(65) Prior Publication Data

US 2015/0334319 A1 Nov. 19, 2015

(30) Foreign Application Priority Data

May 14, 2014 (JP) ................. 2014-100792

(51) Int. Cl.
| | |
|---|---|
| *G06T 5/20* | (2006.01) |
| *H04N 5/357* | (2011.01) |
| *G06T 5/10* | (2006.01) |
| *H04N 5/217* | (2011.01) |

(52) U.S. Cl.
CPC . *G06T 5/20* (2013.01); *G06T 5/10* (2013.01); *H04N 5/217* (2013.01); *H04N 5/357* (2013.01)

(58) Field of Classification Search
CPC .................. H04N 5/357; G06T 5/10
See application file for complete search history.

(56) References Cited

U.S. PATENT DOCUMENTS

| | | | | |
|---|---|---|---|---|
| 4,553,165 A | * | 11/1985 | Bayer | ............ G06T 5/002 348/386.1 |
| 2004/0208389 A1 | * | 10/2004 | Lin | ............ H04N 19/423 382/260 |
| 2013/0057578 A1 | * | 3/2013 | Matsuzaki | ............ G06T 1/20 345/629 |

FOREIGN PATENT DOCUMENTS

| | | |
|---|---|---|
| JP | 2000-312311 A | 11/2000 |
| JP | 2002-304624 A | 10/2002 |
| JP | 2008-59452 A | 3/2008 |
| JP | 2013-65283 A | 4/2013 |

* cited by examiner

*Primary Examiner* — James Hannett
(74) *Attorney, Agent, or Firm* — Arent Fox LLP

(57) ABSTRACT

An image processing apparatus includes a memory unit configured to store original image data, a read unit configured to read, from the memory unit, image data of a rectangular area that is part of the original image data, to set pixel values to a flanking area that is added to the rectangular area in a surrounding space thereof, and to output extended image data inclusive of the image data of the rectangular area and image data of the flanking area to which the pixel values are set, and a first filtering process unit configured to apply a filtering process to the extended image data.

8 Claims, 18 Drawing Sheets

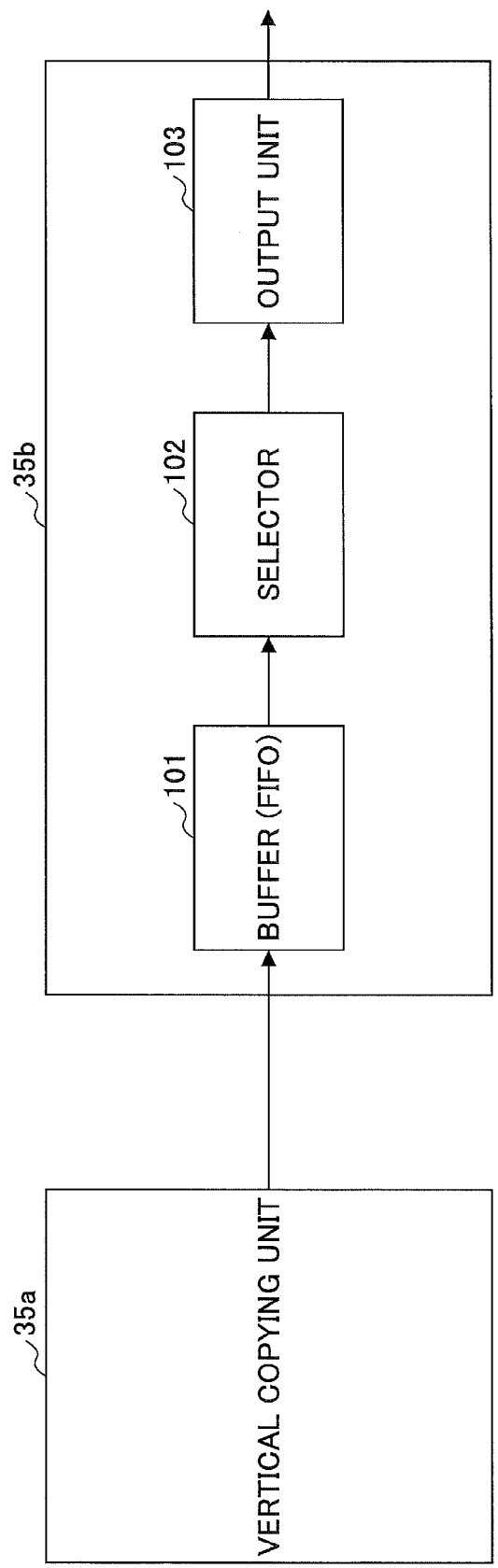

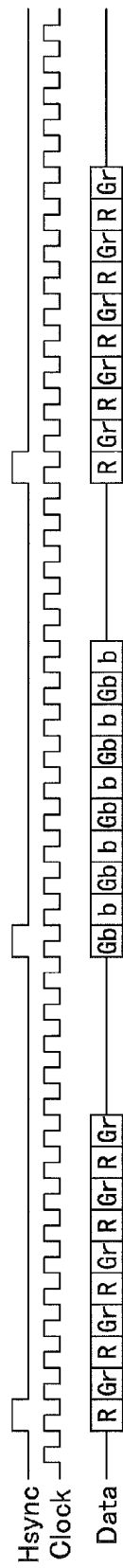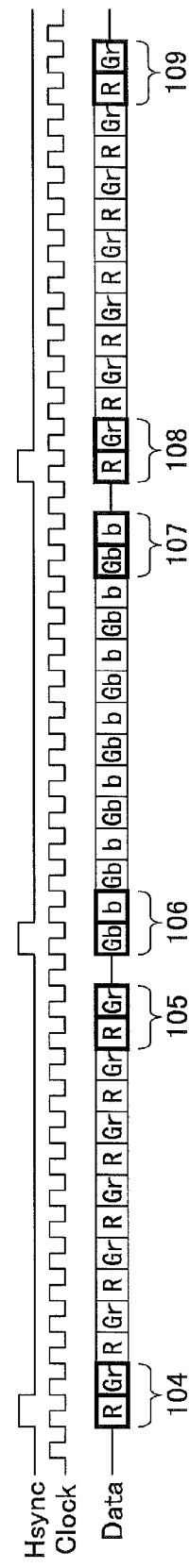

IMAGE PROCESSING APPARATUS, IMAGING APPARATUS, AND METHOD FOR PROCESSING IMAGE

CROSS-REFERENCE TO RELATED APPLICATIONS

The present application is based upon and claims the benefit of priority from the prior Japanese Patent Application No. 2014-100792 filed on May 14, 2014, with the Japanese Patent Office, the entire contents of which are incorporated herein by reference.

FIELD

The disclosures herein relate to an image processing apparatus, an imaging apparatus, and an image processing method.

BACKGROUND

An imaging apparatus such as a digital still camera employs an analog frontend to convert an image captured by an imaging sensor from analog signals into digital signals, followed by applying various types of image processing to the digital image data. Image processing such as filtering is applied to image data that is retrieved from an SDRAM (synchronous dynamic random access memory) serving as a frame memory after the image data is written to the SDRAM.

The size of entire image data written to the SDRAM may be N pixels in the horizontal direction and M lines in the vertical direction. In such a case, the use of a filter having a vertical size of L pixels means that data of N pixels arranged in the horizontal direction for one line may be retrieved for L lines equal to the vertical size of the filtering process, thereby allowing the filtering process to be performed with respect to all the data in the horizontal direction. However, this arrangement may necessitate the provision of a memory having a size of N×L pixels in the filtering process unit that performs the filtering process.

In order to reduce the size of a memory provided in the filtering process unit, image data may be divided into a plurality of rectangular areas, and a filtering process may be applied to the image data of each rectangular area that is retrieved separately from an SDRAM. For example, one horizontal line may be divided by 16. With the vertical size of a filter being L pixels, it suffices for the filtering process unit to have a memory having a size of N/16 pixels by L pixels. However, calculating the output values of a filtering process at the borders of a rectangular area involves the use of pixel values in an area that is situated immediately outside the rectangular area. Such an area will hereinafter be referred to as a flanking area. Accordingly, retrieving the image data of a rectangular area from an SDRAM may be accompanied by a process of retrieving the image data of a flanking area that is to be added to the outside of the borders, followed by supplying both of the retrieved data to the filtering process unit.

FIG. 1 is a drawing illustrating different positional relationships between a rectangular area and a flanking area when retrieving data from an SDRAM. FIG. 1 illustrates a rectangular area 10 and flanking areas 11a through 11i. As will be described in the following, positional relationships between the rectangular area 10 retrieved from an SDRAM and a flanking area thereof are classified into 9 different patterns.

When the rectangular area 10 situated at the top left corner of the entire image data is retrieved, the flanking area retrieved in conjunction therewith is a portion of the rectangular area situated on the immediate right of the rectangular area 10 and a portion of the rectangular area situated immediately below the rectangular area 10. In this case, the data retrieved from the SDRAM include the rectangular area 10 and the flanking area 11a as illustrated at the top left corner in FIG. 1. The same or similar retrieval operation is performed when the rectangular area 10 situated at other corners is retrieved. The data retrieved from the SDRAM in such a case include the rectangular area 10 and the flanking area 11c as illustrated at the top right corner in FIG. 1, the rectangular area 10 and the flanking area 11g as illustrated at the bottom left corner in FIG. 1, or the rectangular area 10 and the flanking area 11i as illustrated at the bottom right corner in FIG. 1.

When the rectangular area 10 situated on the upper edge of the entire image data is retrieved, the flanking area retrieved in conjunction therewith is a portion of the rectangular area situated on the immediate left of the rectangular area 10, a portion of the rectangular area situated on the immediate right of the rectangular area 10, and a portion of the rectangular area situated immediately below the rectangular area 10. In this case, the data retrieved from the SDRAM include the rectangular area 10 and the flanking area 11b as illustrated at the top center in FIG. 1. The same or similar retrieval operation is performed when the rectangular area 10 situated on other edges is retrieved. The data retrieved from the SDRAM in such a case include the rectangular area 10 and the flanking area 11d as illustrated on the middle left in FIG. 1, the rectangular area 10 and the flanking area 11f as illustrated on the middle right in FIG. 1, or the rectangular area 10 and the flanking area 11h as illustrated at the bottom center in FIG. 1.

Further, when the rectangular area 10 in contact with none of the edges of the entire image data (i.e., the rectangular area 10 fully surrounded by other rectangular areas 10) is retrieved, the flanking area retrieved in conjunction therewith is a portion of the 8 rectangular areas in the immediate proximity of the retrieved rectangular area 10. In this case, the data retrieved from the SDRAM include the rectangular area 10 and the flanking area 11e as illustrated at the center in FIG. 1.

As described above, the positional relationship between the rectangular area 10 and the flanking area retrieved together therewith varies depending on the position of the rectangular area 10 retrieved from the SDRAM relative to the entire image data. Specifically, there are 9 different positional patterns as illustrated in FIG. 1. It thus follows that a retrieval unit for retrieving the image data of the rectangular area 10 from the SDRAM may need to control a read address in response to the relative position of the rectangular area 10 that is to be retrieved, such that data retrieval is properly performed with respect to the 9 different positional patterns. Further, the size of the image data to be retrieved may need to be changed depending on the position of the rectangular area 10 that is to be retrieved. As a result, a retrieval process ends up involving complex control. Designing a retrieval unit performing such complex control results in a cost increase and an increase in design time.

A filtering process unit outputs image data having the same size as the rectangular area 10 when outputting the result of a filtering process. Because of this, the fact that the positional relationship between the rectangular area 10 and the flanking area varies as illustrated in FIG. 1 means that there is also a change in the positional relationship between the input into the filtering process unit and the output from the filtering process unit.

FIG. 2 is a drawing illustrating positional relationships between the input image data and output image data of a filtering process unit. FIG. 2 illustrates input image data 12a through 12i input into a filtering process unit and the rectangular areas 10 included therein. The rectangular area 10 will be the output image data of the filtering process unit. As will be described below, the positional relationships between the input image data and the output image data are classified into four different patterns.

When the rectangular area 10 situated at the top left corner of the entire image data is subjected to the filtering process, the positional relationship between the input image data and output image data of the filtering process unit is illustrated at the top left in FIG. 2 as the positional relationship between the input image data 12a and the rectangular area 10. In this case, the coordinates of the top left corner of the input image data 12a coincide with the coordinates of the top left corner of the output image data.

When the rectangular area 10 situated on the top edge of the entire image data is subjected to the filtering process, the positional relationship between the input image data and output image data of the filtering process unit is illustrated at the top center in FIG. 2 as the positional relationship between the input image data 12b and the rectangular area 10. When the rectangular area 10 situated at the top right corner of the entire image data is subjected to the filtering process, the positional relationship between the input image data and output image data of the filtering process unit is illustrated at the top right in FIG. 2 as the positional relationship between the input image data 12c and the rectangular area 10. In this case, the coordinates of the top left corner of the output image data are displaced to the right in the horizontal direction relative to the coordinates of the top left corner of the input image data.

When the rectangular area 10 situated on the left edge of the entire image data is subjected to the filtering process, the positional relationship between the input image data and output image data of the filtering process unit is illustrated on the middle left in FIG. 2 as the positional relationship between the input image data 12d and the rectangular area 10. When the rectangular area 10 situated at the bottom left corner of the entire image data is subjected to the filtering process, the positional relationship between the input image data and output image data of the filtering process unit is illustrated at the bottom left in FIG. 2 as the positional relationship between the input image data 12g and the rectangular area 10. In these cases, the coordinates of the top left corner of the output image data are displaced downwardly in the vertical direction relative to the coordinates of the top left corner of the input image data.

In the cases other than those described above, the positional relationships between the input image data and output image data of the filtering process unit are as illustrated by four patterns situated toward the bottom right corner in FIG. 2, i.e., the positional relationships between the input image data 12e, 12f, 12h, and 12i and the respective rectangular areas 10. In these cases, the coordinates of the top left corner of the output image data are displaced toward the lower right relative to the coordinates of the top left corner of the input image data.

As described above, the positional relationship between the input image data and output image data of the filtering process unit varies depending on the position of the rectangular area 10 retrieved from the SDRAM relative to the entire image data. Specifically, there are 4 different positional patterns as illustrated in FIG. 2. The filtering process unit may thus generate output image data by discriminating the four different positional patterns from each other depending on the position of the rectangular area 10 that is to be processed. As a result, the filtering process ends up involving complex output coordinate control. Designing a filtering process unit performing such complex control results in a cost increase and an increase in design time.

RELATED-ART DOCUMENTS

Patent Document

[Patent Document 1] Japanese Laid-open Patent Publication No. 200859452
[Patent Document 2] Japanese Laid-open Patent Publication No. 2002304624

SUMMARY

According to an aspect of the embodiment, an image processing apparatus includes a memory unit configured to store original image data, a read unit configured to read, from the memory unit, image data of a rectangular area that is part of the original image data, to set pixel values to a flanking area that is added to the rectangular area in a surrounding space thereof, and to output extended image data inclusive of the image data of the rectangular area and image data of the flanking area to which the pixel values are set, and a first filtering process unit configured to apply a filtering process to the extended image data.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 18 is a drawing illustrating an example of the configuration of a horizontal copying unit;

FIG. 19 is a drawing illustrating an example of the operation of the horizontal copying unit;

FIG. 20 is a drawing illustrating an example of the operation of the horizontal copying unit;

DESCRIPTION OF EMBODIMENTS

In the following, embodiments of the invention will be described with reference to the accompanying drawings. In these drawings, the same or corresponding elements are referred to by the same or corresponding numerals, and a description thereof will be omitted as appropriate.

Figure 1:
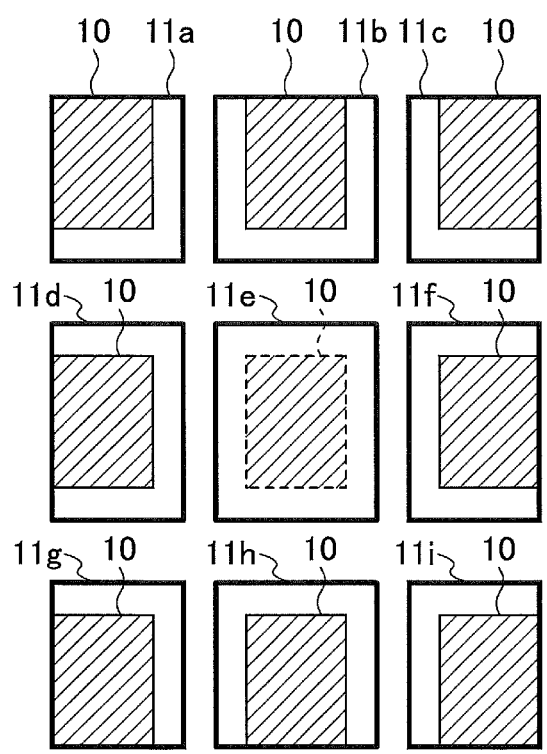
FIG. 1 is a drawing illustrating different positional relationships between a rectangular area and a flanking area when retrieving data from an SDRAM.
Figure 2:
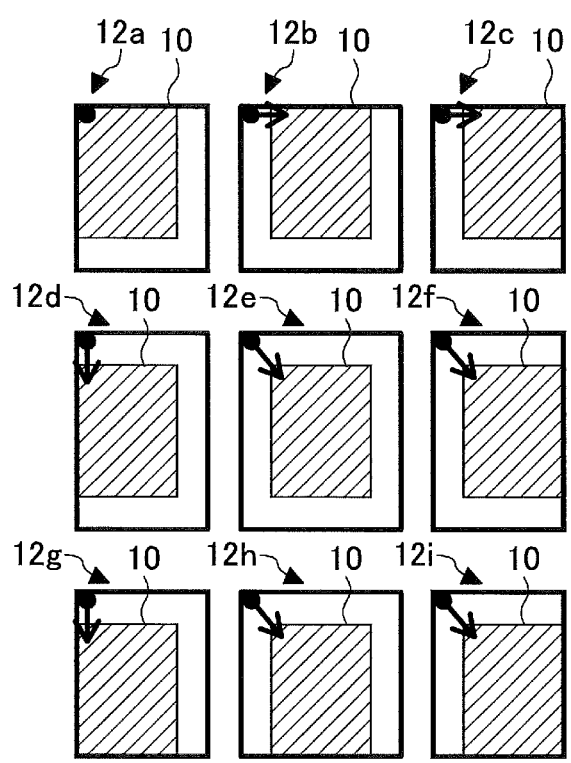
FIG. 2 is a drawing illustrating positional relationships between the input image data and output image data of a filtering process unit.
Figure 3:
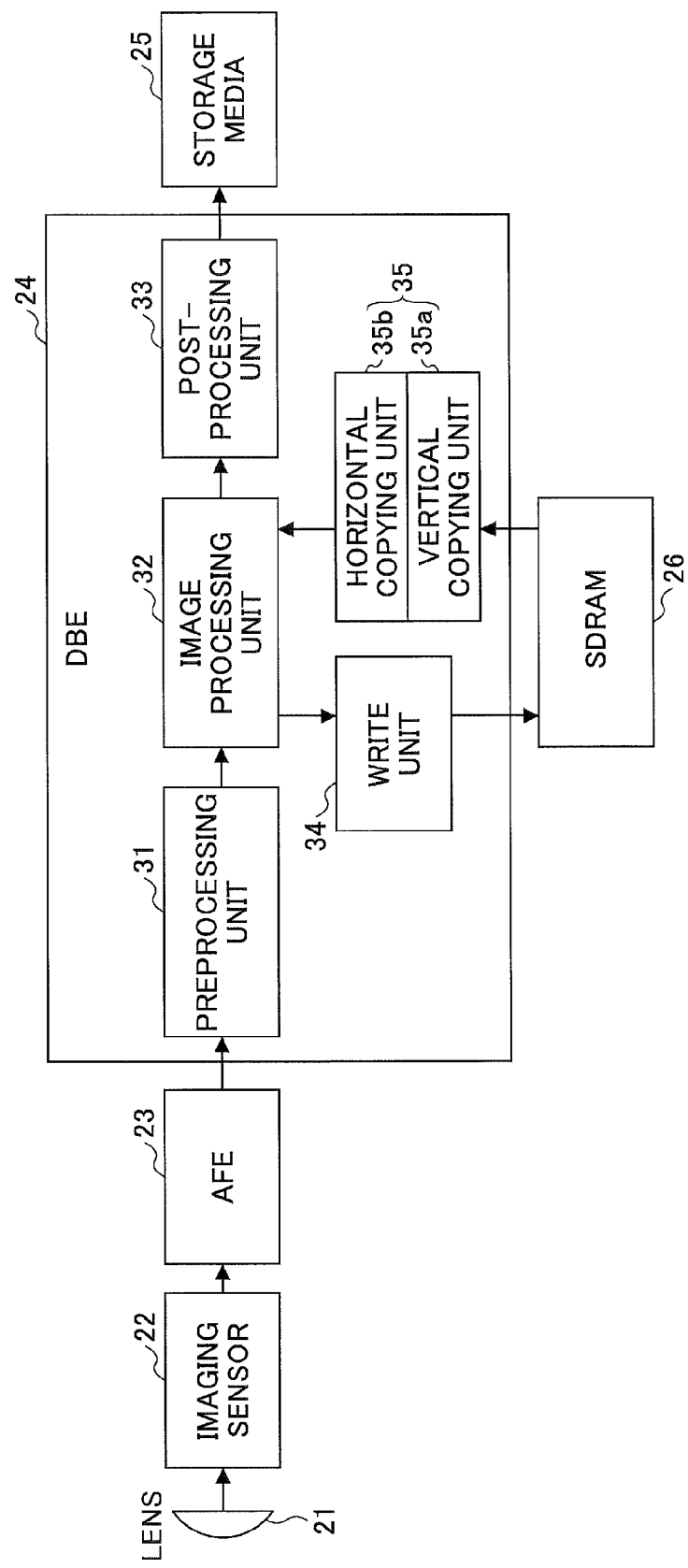
FIG. 3 is a drawing illustrating an example of the configuration of an imaging apparatus.

FIG. 3 is a drawing illustrating an example of the configuration of an imaging apparatus. The imaging apparatus illustrated in FIG. 3 includes a lens 21, an imaging sensor 22, an AFE (analog frontend) 23, a DBE (digital backend) 24, a storage media 25, and an SDRAM (synchronous dynamic random access memory) 26. The DBE 24 includes a preprocessing unit 31, an image processing unit 32, a post-processing unit 33, a write unit 34, a read unit 35.

In FIG. 3 and the subsequent drawings, boundaries between functional blocks illustrated as boxes basically indicate functional boundaries, and may not correspond to separation in terms of physical positions, separation in terms of electrical signals, separation in terms of control logic, etc. Each functional block may be a hardware module implemented as an electronic circuit block having a relevant function, or may be a software unit providing a relevant function that is implemented as a software module executed by a general-purpose processor that is an electronic circuit. In the case of hardware implementation, each functional block may be a hardware module that is physically separated from other blocks to some extent, or may indicate a function in a hardware module in which this and other blocks are physically combined together. In the case of software implementation, each functional block may be a software module that is logically separated from other blocks to some extent, or may indicate a function in a software module in which this and other blocks are logically combined together.

The imaging sensor 22 captures an image of an object by detecting light received through the lens 21, and outputs analog signals indicative of the captured image. The AFE 23 converts the analog signals from the imaging sensor 22 into digital signals to output digital image data. The DBE 24 applies various processes to the digital image data to output the processed image data to the storage media 25. The storage media 25 stores the processed image data that are supplied from the DBE 24.

The preprocessing unit 31 of the DBE 24 performs a defective pixel correction that corrects the pixel value of a defective pixel with respect to the image data supplied from the AFE 23, and performs a shading correction that corrects variation in the image density caused by device characteristics, in addition to other processes such as white-balance adjustment and gamma correction. The image processing unit 32 various types of image processing such as a filtering process. The image processing unit 32 supplies the image data processed by the preprocessing unit 31 to the write unit 34, so that the write unit 34 writes the image data to the SDRAM 26.

The read unit 35 reads the image data of a rectangular area that is part of the above-noted image data from the SDRAM 26. The read unit 35 sets pixel values to a flanking area that is to be added to the periphery of the rectangular area, followed by outputting extended image data inclusive of the image data of the rectangular area and the image of the flanking area to which pixel values are already set. The extended image data output from the read unit 35 is supplied to the image processing unit 32. The read unit 35 includes a vertical copying unit 35a and a horizontal copying unit 35b for the purpose of setting pixel values to a flanking area. The read unit 35 uses the vertical copying unit 35a and the horizontal copying unit 35b to set the same values as some interior pixel values of the rectangular area to the flanking area in order to set pixel values to the flanking area. Another method may be employed to set pixel values to a flanking area rather than setting the same values as some interior pixel values of the rectangular area to the flanking area. For example, a constant pixel value may fill the entire flanking area to set pixel values to the flanking area.

The image processing unit 32 various types of image processing such as a filtering process. The filtering process may involve filtering processes for noise removal, edge enhancement, smoothing, etc. Image data after image processing by the image processing unit 32 may be written to the SDRAM 26 via the write unit 34 or may be directly supplied from the image processing unit 32 to the post-processing unit 33. In the case of the image data after the image processing being stored in the SDRAM 26, the read unit 35 may subsequently read the image data, and may supply the read image data to the post-processing unit 33.

The post-processing unit 33 performs a filtering process, an image reduction process, an image enlargement process, a color-space-conversion process, a JPEG (joint photographic experts group) encoding process, etc. Image data that is provided by the post-processing unit 33 in a format suitable for storage in the storage media 25 is supplied to the storage media 25 for storage therein.

Figure 4:
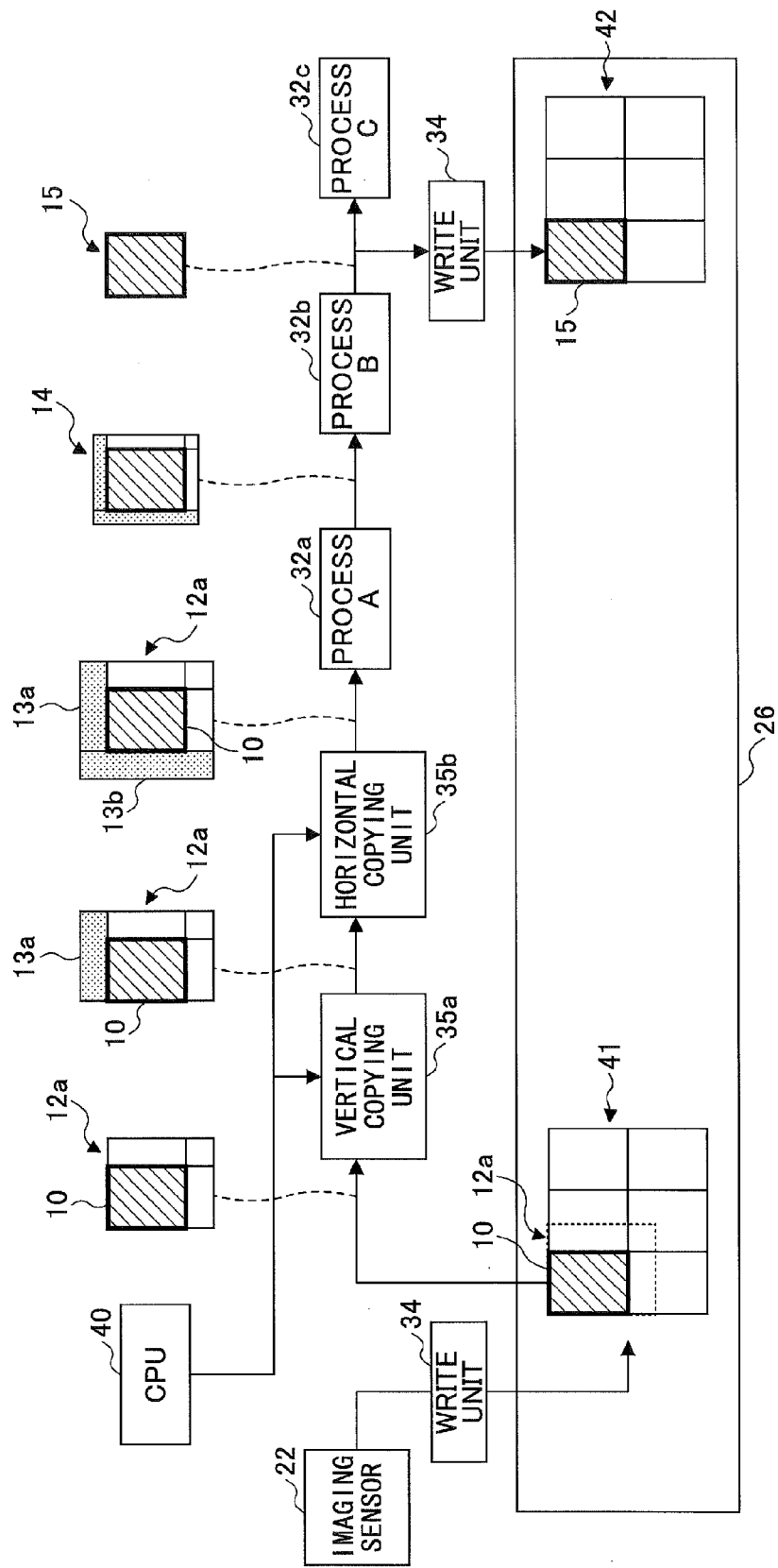
FIG. 4 is a drawing illustrating a first embodiment of the process of setting pixel values to a flanking area.

FIG. 4 is a drawing illustrating a first embodiment of the process of setting pixel values to a flanking area. Image data captured by the imaging sensor 22 is written by the write unit 34 to the SDRAM 26 as image data 41. FIG. 4 illustrates a schematic process flow, in which the processes performed by the AFE 23 and the preprocessing unit 31 illustrated in FIG. 3 are omitted from illustration. Further, image data before and after respective processes are schematically illustrated at the top of FIG. 4. It may be noted that two write units 34 are illustrated in FIG. 4. These two write units 34 rather than a single write unit 34 are depicted in the illustration for the sake of illustrating the flow of the process, and the physical entity thereof is the single write unit 34 illustrated in FIG. 3.

The CPU (central processing unit) 40 controls the vertical copying unit 35a and the horizontal copying unit 35b. The vertical copying unit 35a of the read unit 35 reads from the SDRAM 26 image data 12a inclusive of the rectangular area 10 that is part of the image data 41. The image data 12a includes the rectangular area 10 and the image data of a flanking area, which is situated in the immediate proximity of the rectangular area 10 and has a predetermined size. There are adjacent rectangular areas situated immediately below, on the immediate lower right, and on the immediate right of the rectangular area 10 of interest, respectively. Image data that is part of these rectangular areas and the image data of the rectangular area 10 of interest are read from the SDRAM 26 as the image data 12a. The rectangular area 10 of interest is situated at the top left corner of the image data 41, so that there is no image data situated above, on the upper left, and on the left of the rectangular area 10 of interest.

The vertical copying unit 35a sets pixel values to a flanking area 13a that is to be added to the image data 12a inclusive of the rectangular area 10 on the upper side thereof. The vertical copying unit 35a outputs extended image data that includes the image data 12a inclusive of the image data of the rectangular area 10 and the image data of the flanking area 13a to which pixel values are already set. In so doing, the pixel values of the flanking area 13a may be set by copying to the flanking area 13a the interior pixel values of the image data 12a that are the values of pixels situated in the immediate proximity of the upper edge of the image data 12a (i.e., the values of pixels situated on the upper edge of the image data 12a).

The extended image data produced by the vertical copying unit 35a is supplied to the horizontal copying unit 35b. The horizontal copying unit 35b sets pixel values to a flanking area 13b that is to be added to the image data 12a inclusive of the rectangular area 10 on the left side thereof. The horizontal copying unit 35b outputs extended image data that includes the image data 12a inclusive of the image data of the rectangular area 10 and the image data of the flanking areas 13a and 13b to which pixel values are already set. In so doing, the pixel values of the flanking area 13b may be set by copying to the flanking area 13b the interior pixel values of the image data 12a that are the values of pixels situated in the immediate proximity of the left edge of the image data 12a.

A processing unit 32a applies a filtering process A to the extended image data output from the horizontal copying unit 35b to output image data 14 having undergone the filtering process. A processing unit 32b applies a filtering process B to the image data 14 output from the processing unit 32a to output image data 15 having undergone the filtering process. The write unit 34 writes the image data 15 output from the processing unit 32b to the SDRAM 26.

Similarly, all the rectangular areas of the image data 41 are subjected to the filtering process A and the filtering process B after pixel values are set to the flanking areas as needed, and, then, the image data having undergone these filtering processes is written to the SDRAM 26, so that image data 42 having undergone the filtering processes is obtained. The image data 15 output from the processing unit 32b may be further subjected to image processing C by a processing unit 32c.

The original image data 41 illustrated in FIG. 4 includes a total of six rectangular areas arranged in an array of three rectangular areas in the horizontal direction and two rectangular areas in the vertical direction. In reality, however, the image data 41 may include larger numbers of rectangular areas in the horizontal direction and in the vertical direction. In such a case, the rectangular areas 10 that are situated at the four corners of the original image data 41 are subjected to the pixel-value setting processes by the vertical copying unit 35a and the horizontal copying unit 35b with respect to both a flanking area in the immediate proximity in the vertical direction and a flanking area in the immediate proximity in the horizontal direction. The rectangular areas 10 that are situated on the upper or lower edge of the original image data 41 are subjected to the pixel-value setting process by the vertical copying unit 35a with respect to a flanking area in the immediate proximity in the vertical direction. The rectangular areas 10 that are situated on the left or right edge of the original image data 41 are subjected to the pixel-value setting process by the horizontal copying unit 35b with respect to a flanking area in the immediate proximity in the horizontal direction.

Figure 5:
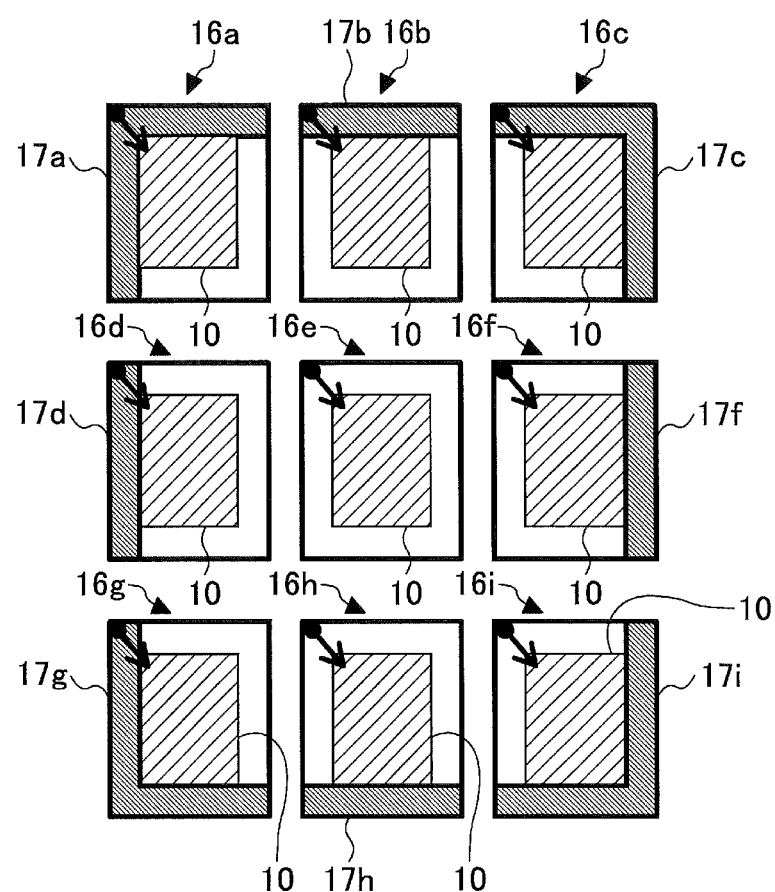
FIG. 5 is a drawing illustrating the effect of a pixel-value setting process with respect to a flanking area.

FIG. 5 is a drawing illustrating the effect of a pixel-value setting process with respect to a flanking area. As was described in connection with FIG. 4, the pixel-value setting process performed by the vertical copying unit 35a and/or the horizontal copying unit 35b with respect to a flanking area produces extended image data that has a flanking area usable for filtering calculation in the four directions of the rectangular area 10, i.e., the upper, lower, left, and right directions.

As far as the position at which a flanking area is added is concerned, there are 8 different patterns corresponding to flanking areas 17a through 17d and 17f through 17i that are added as illustrated in FIG. 5. Including the case in which no flanking area is added results in a total of 9 different patterns being in existence. In the case of the rectangular area 10 situated at the top left corner of original image data, for example, the flanking area is added to the rectangular area 10 on the upper side and left side thereof as illustrated as the flanking area 17a. In the case of the rectangular area 10 situated on the right edge of the original image data, for example, the flanking area is added to the rectangular area 10 on the right side thereof as illustrated as the flanking area 17f. In the case of the rectangular area 10 that is not in contact with the perimeter edges of the original image data, the image data of the adjacent rectangular areas are present from the beginning in all the directions thereof. There is thus no need to newly add a flanking area.

In any one of the 9 patterns illustrated in FIG. 5, the image data of the rectangular area 10, the image data of the flanking areas that are part of the adjacent rectangular areas in the immediate proximity, and the image data of the one or more added flanking areas are combined to create rectangular image data 16a through 16i, all of which are the same size. Namely, the rectangular image data 16a through 16i all have the same horizontal and vertical sizes, and also have the same positional relationship between the coordinates of the top left corner thereof and the coordinates of the top left corner of the corresponding rectangular area 10. Specifically, the top left corner of the rectangular area 10 inside a given one of the rectangular image data 16a through 16i is displaced by a constant distance toward the lower right relative to the top left corner of the corresponding one of the rectangular image data 16a through 16i as indicated by an arrow.

Accordingly, the positional relationship between the input image data and output image data of the filtering process unit is kept constant with respect to all the rectangular image data 16a through 16i that are subjected to filtering processes. Namely, the filtering process unit does not need to generate output image data by discriminating the different positional patterns from each other depending on the position of the rectangular area 10 that is to be processed, which allows simple output coordinate control to be used for the filtering process. Designing a filtering process unit performing such simple control is relatively easy, resulting in cost reduction and a shortened design time.

Figure 6:
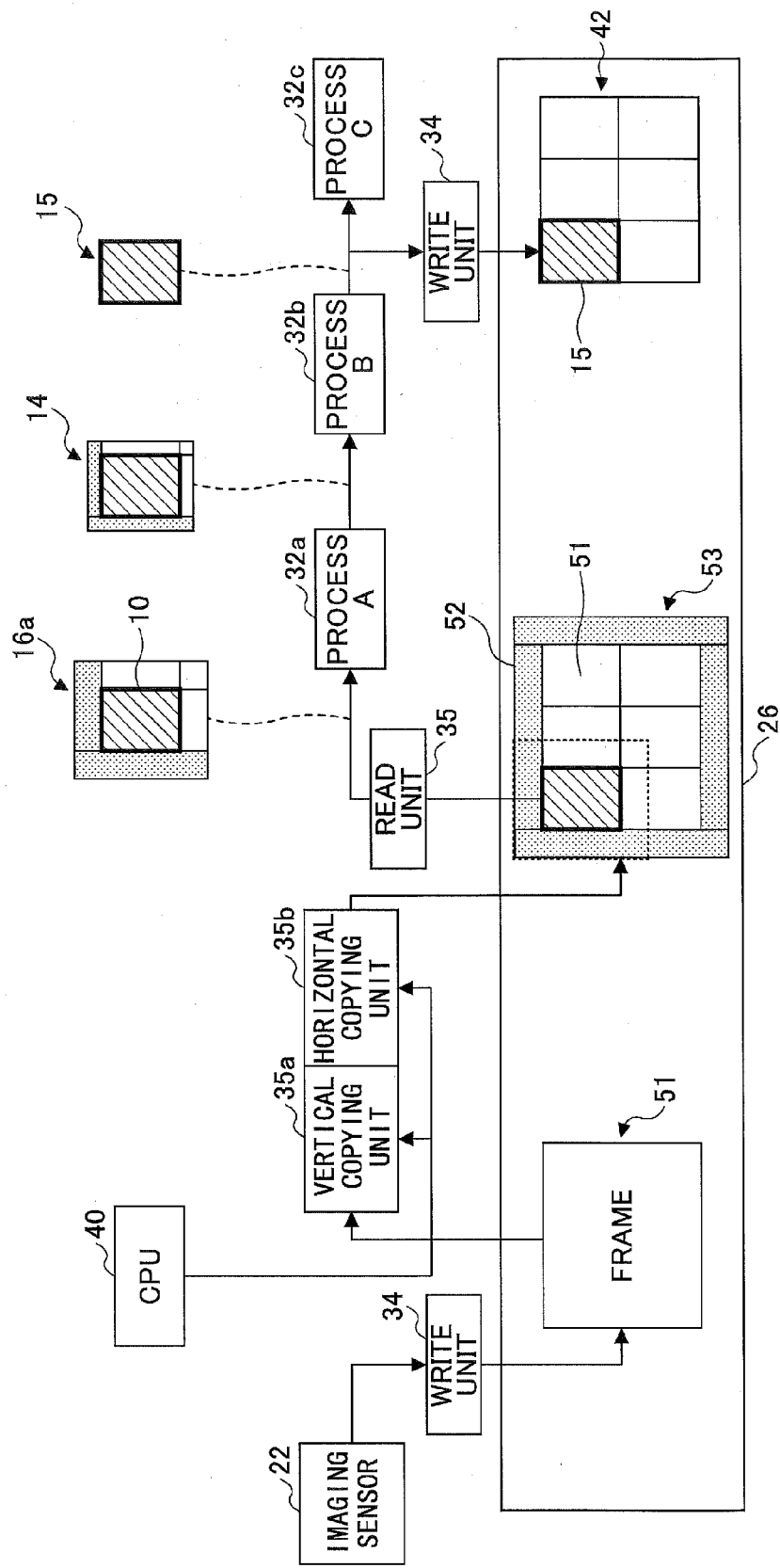
FIG. 6 is a drawing illustrating a second embodiment of the process of setting pixel values to a flanking area.

FIG. 6 is a drawing illustrating a second embodiment of the process of setting pixel values to a flanking area. Image data captured by the imaging sensor 22 is written by the write unit 34 to the SDRAM 26 as image data 51. FIG. 6 illustrates a schematic process flow, in which the processes performed by the AFE 23 and the preprocessing unit 31 illustrated in FIG. 3 are omitted from illustration. Further, image data before and after respective processes are schematically illustrated at the top of FIG. 6. It may be noted that two write units 34 are illustrated in FIG. 6. These two write units 34 rather than a single write unit 34 are depicted in the illustration for the sake of illustrating the flow of the process, and the physical entity thereof is the single write unit 34 illustrated in FIG. 3. The same applies in the case of the read unit 35, the vertical copying unit 35a, and the horizontal copying unit 35b, and the physical entity of these units is the single write unit 34 illustrated in FIG. 3.

The CPU (central processing unit) 40 controls the vertical copying unit 35a and the horizontal copying unit 35b. The vertical copying unit 35a of the read unit 35 reads the image data of a rectangular area that is part of the image data 51 from the SDRAM 26. The image data read at this time may only be the image data of the rectangular area regardless of the position of the rectangular area that is read. Namely, the image data of a portion of the adjacent rectangular areas situated in the immediate proximity of the rectangular area of interest is not read together with the image data of the rectangular area of interest.

In the case of the read rectangular area being situated on the upper or lower edge of the image data 51, the vertical copying unit 35a adds a flanking area by setting pixel values to a flanking area that corresponds to the outside of the image data 51. The vertical copying unit 35a outputs extended image data inclusive of the image data of the rectangular area and the image data of the flanking area to which pixel values are already set. In so doing, the pixel values of the flanking area may be set by copying the interior pixel values of the rectangular area that are the values of pixels situated in the immediate proximity of the upper or lower edge of the rectangular area.

The extended image data produced by the vertical copying unit 35a is supplied to the horizontal copying unit 35b. In the case of the read rectangular area being situated on the left or right edge of the image data 51, the horizontal copying unit 35b adds a flanking area by setting pixel values to a flanking area that corresponds to the outside of the image data 51. The horizontal copying unit 35b outputs extended image data inclusive of the image data of the rectangular area and the image data of the flanking area to which pixel values are already set. In so doing, the pixel values of the flanking area may be set by copying the interior pixel values of the rectangular area that are the values of pixels situated in the immediate proximity of the left or right edge of the rectangular area.

The extended image data generated by the horizontal copying unit 35b is written to the SDRAM 26. In so doing, the horizontal copying unit 35b writes the image data of each rectangular area to the SDRAM 26 in such a manner that the original positional relationships between the individual rectangular areas are maintained in the image data 51. Through this arrangement, the SDRAM 26 has image data 53 stored therein The image data 53 includes the original image data 51 having the rectangular areas thereof arranged in the vertical direction and in the horizontal direction, and also includes a flanking area 52 that is added to the periphery of the image data 51.

In the manner as described above, the read unit (i.e., the vertical copying unit 35a and the horizontal copying unit 35b) successively reads from the SDRAM 26 the image data of all the rectangular areas included in the image data 51. In the case of a rectangular area situated on the perimeter edges of the image data 51, the read unit 35 writes the extended image data to a pertinent position in the SDRAM 26. In the case of a rectangular area in contact with none of the perimeter edges of the image data 51, the read unit 35 writes the image data of the read rectangular area, as it is, to the position of the corresponding rectangular area in the SDRAM 26.

Subsequently, the read unit 35 reads, from the image data 53 stored in the SDRAM 26, the image data of an extended rectangular area that includes the image data of a given rectangular area and the image data of a flanking area having a predetermined size situated in the immediate proximity (i.e., immediate surroundings) of the given rectangular area. The image data of the read extended rectangular area may be image data 16a in which the data of a portion of the adjacent rectangular areas and the flanking area to which pixel values are set are arranged in the immediate surroundings of the rectangular area 10 as illustrated in FIG. 6. The image data of the extended rectangular area is supplied to the processing unit 32a.

The processing unit 32a applies the filtering process A to the image data of the extended rectangular area read from the SDRAM 26 to output the image data 14 having undergone the filtering process. The processing unit 32b applies the filtering process B to the image data 14 output from the processing unit 32a to output the image data 15 having undergone the filtering process. The write unit 34 writes the image data 15 output from the processing unit 32b to the SDRAM 26.

Similarly, all the rectangular areas of the image data 41 are subjected to the filtering process A and the filtering process B after pixel values are set to the flanking areas as needed, and, then, the image data having undergone these filtering processes is written to the SDRAM 26, so that image data 42 having undergone the filtering processes is obtained. The image data 15 output from the processing unit 32b may be further subjected to image processing C by the processing unit 32c.

In the second embodiment of the pixel-value setting process illustrated in FIG. 6, it suffices for the read unit 35 to simply read each rectangular area 10 of the image data 51 as it is when reading the image data 51 the first time from the SDRAM 26. Namely, there is no need to read a flanking area in the immediate proximity of the rectangular area 10 at the same time. With this arrangement, it suffices for the read unit 35 to read image data of a constant size regardless of the position of the rectangular area 10 when reading the rectangular area 10 of the image data 51 the first time. This allows simple read address control to be employed. When reading the image data 53 the second time from the SDRAM 26, it suffices for the read unit 35 to read the image data of an extended rectangular area that includes the rectangular area 10 of interest in the image data 53 and the image data of a flanking area having a predetermined size that surrounds the rectangular area 10 of interest. The image data of the extended rectangular area has a constant size and a constant shape regardless of the position of the rectangular area 10. With this arrangement, therefore, it suffices for the read unit 35 to read image data of a constant size regardless of the position of the rectangular area 10 when reading the rectangular area 10 of the image data 53 the second time. This allows simple read address control to be employed. Designing a read unit performing such simple control is relatively easy, resulting in cost reduction and a shortened design time.

As can be seen from the above description, image data subjected to a filtering process in the image processing unit 32 illustrated in FIG. 3 has the image data of a flanking area already attached thereto the amount of which is sufficient for the filtering arithmetic operation to be performed. Because of this, the filtering process in the image processing unit 32 does not need to perform a process of generating the data of surrounding pixels by extrapolation (i.e., by padding).

When the image processing unit 32 illustrated in FIG. 3 performs filtering, the image processing unit 32 may successively perform a plurality of filtering processes. In such a case, the image data input into the filtering process that is the first to be performed among the plurality of filtering processes may preferably have a sufficient amount of image data of a flanking area attached thereto. This point will be described in the following.

Figure 7:
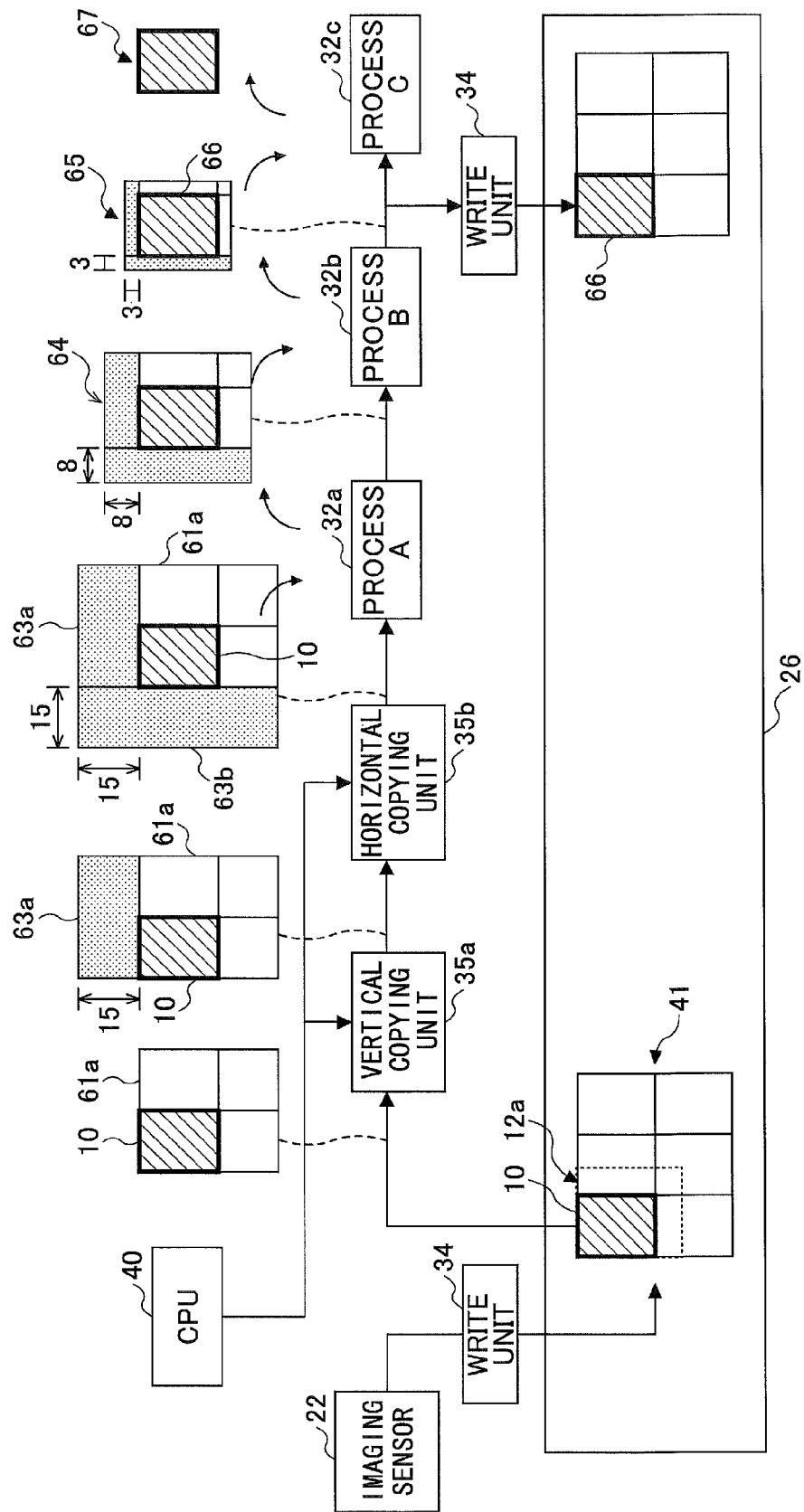
FIG. 7 is a drawing illustrating the size of a flanking area for a plurality of filtering processes having different filter sizes.

FIG. 7 is a drawing illustrating the size of a flanking area for a plurality of filtering processes having different filter sizes. In FIG. 7, the same or corresponding elements as those of FIG. 4 are referred to by the same or corresponding numerals, and a description thereof will be omitted as appropriate.

In the example illustrated in FIG. 7, three filtering processes are performed in a sequence. The filtering process A by the processing unit 32a is performed by use of a filter matrix having a size of 7×7. The filtering process B by the processing unit 32b is performed by use of a filter matrix having a size of 5×5. The filtering process C by the processing unit 32c is performed by use of a filter matrix having a size of 3×3. In order to ensure that image data having the same size as the rectangular area 10 is obtained after performing these three filtering processes, the image data input into the last-stage filtering process C may have the image data of three pixels on each of the upper side, the lower side, the left side, and the right side of the rectangular area 10 as a flanking area for filter calculation. That is, with the size of the rectangular area 10 being X pixels by Y pixels, the image data output form the filtering process B (i.e., image data input into the filtering process C) may have a size of (X+3×2) pixels by (Y+3×2) pixels. In order to ensure that the image data output from the filtering process B having a filter size of 5×5 has a size of (X+3×2) pixels by (Y+3×2) pixels, the image data output from the filtering process A may have a size of (X+(3+5)×2) pixels by (Y+(3+5)×2) pixels. Further, in order to ensure that the image data output from the filtering process A having a filter size of 7×7 has a size of (X+(3 +5)×2) pixels by (Y+(3+5)×2) pixels, the image data input into the filtering process A may have a size of (X+(3+5+7)×2) pixels by (Y+(3+5+7)×2) pixels.

As can be seen from the description provided above, the vertical copying unit 35a and the horizontal copying unit 35b add flanking areas 63a and 63b each having a width of 15 pixels to the rectangular area 10, respectively, thereby to generate the image data input into the processing unit 32a. The processing unit 32a performs the filtering process A having a filter size of 7×7 with respect to such input image data, thereby generating image data 64 in which a flanking area having a width of 8 pixels is attached to the rectangular area 10 in the surroundings thereof. The processing unit 32b performs the filtering process B having a filter size of 5×5 with respect to the image data 64, thereby generating image data 65 in which a flanking area having a width of 3 pixels is attached to a rectangular area 66 in the surroundings thereof. The processing unit 32c performs the filtering process C having a filter size of 3×3 to the image data 65, thereby generating image data 67 having the same size as the rectangular area 10.

In the operations described above, the CPU 40 controls the size of a flanking area 17 to set the size properly when the read unit 35 (i.e., the vertical copying unit 35a and the horizontal copying unit 35b) reads the image data 41 from the SDRAM 26 and sets pixel values to the memory 17. With this arrangement, the read unit 35 sets pixel values to a flanking area having a size larger than the size corresponding to the sum of sizes of the filters (e.g., 15 (=3+5+7) in the example provided above) that are employed in the plurality of successive filtering processes, thereby generating extended image data. The minimum necessary size of the flanking area in such a case is the sum of sizes of the filters that are employed in a plurality of successive filtering processes (e.g., 15 (=3+5+7) in the example provided above). A filtering process unit at a given stage outputs image data having the size of the rectangular area with a flanking area that is attached to the surroundings of the image data and that has a size larger than the size corresponding to the size of the filter employed in the filtering process at the next stage.

Figure 8:
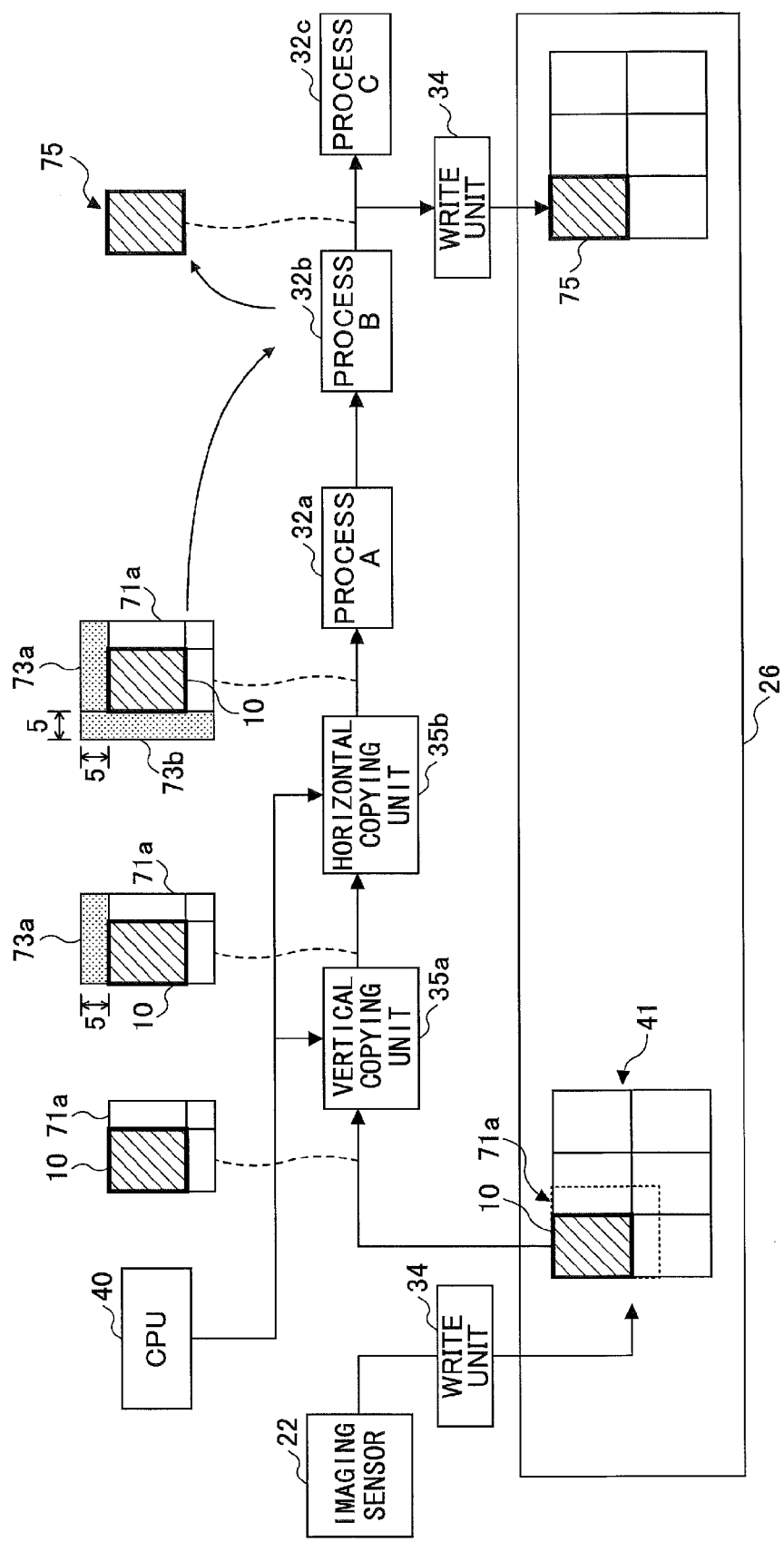
FIG. 8 is a drawing illustrating the size of a flanking area for a plurality of filtering processes having different filter sizes.

FIG. 8 is a drawing illustrating the size of a flanking area for a plurality of filtering processes having different filter sizes. In FIG. 8, the same or corresponding elements as those of FIG. 7 are referred to by the same or corresponding numerals, and a description thereof will be omitted as appropriate.

In the example illustrated in FIG. 8, the processes performed by the processing units 32a and 32c are not filtering processes, and, thus, do not need a flanking area in the surroundings for filtering-process purposes. The process performed by the processing unit 32b is a filtering process using a filter having a size of 5×5. In this case, the vertical copying unit 35a reads from the SDRAM 26 image data 71a that has a flanking area having a width of 5 pixels attached to the rectangular area 10. After this, the vertical copying unit 35a and the horizontal copying unit 35b set pixel values to flanking areas 73a and 73b, respectively, each having the size corresponding to a filter size of 5 ×5 (i.e., each having a width of 5 pixels), thereby generating extended image data. The processing unit 32b performs the filtering process B having a filter size of 5×5 to the above-noted extended image data, thereby generating image data 75 having the same size as the rectangular area 10.

Figure 9:
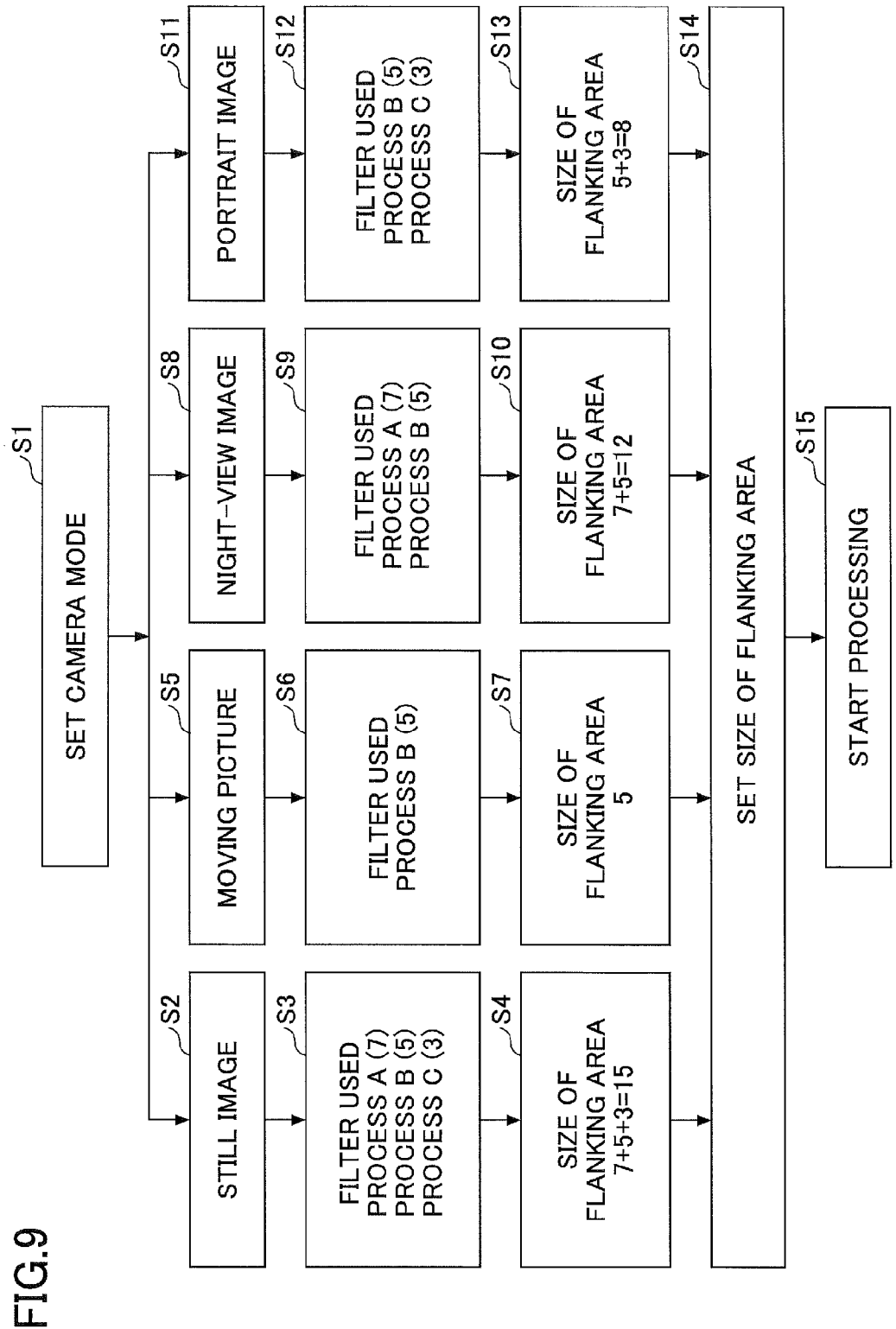
FIG. 9 is a flowchart illustrating an example of the process of setting the size of a flanking area.

FIG. 9 is a flowchart illustrating an example of the process of setting the size of a flanking area. It may be noted that, in FIG. 9 and the subsequent flowcharts, an order in which the steps illustrated in the flowchart are performed is only an example. The scope of the disclosed technology is not limited to the disclosed order. For example, a description may explain that an A step is performed before a B step is performed. Despite such a description, it may be physically and logically possible to perform the B step before the A step while it is possible to perform the A step before the B step. In such a case, all the consequences that affect the outcomes of the flowchart may be the same regardless of which step is performed first. It then follows that, for the purposes of the disclosed technology, it is apparent that the B step can be performed before the A step is performed. Despite the explanation that the A step is performed before the B step, such a description is not intended to place the obvious case as described above outside the scope of the disclosed technology. Such an obvious case inevitably falls within the scope of the technology intended by this disclosure.

In step S1, a camera mode is set. In step S2, a still image is captured. In step S3, the process A having a filter size of 7×7, the process B having a filter size of 5×5, and the process C having a filter size of 3×3 are selected as the filters to be used. In step S4, the size of a flanking area is calculated to be 15.

In step S5, a moving picture is captured. In step S6, the process B having a filter size of 5 ×5 is selected as the filter to be used. In step S7, the size of a flanking area is calculated to be 5.

In step S5, a night-view image is captured. In step S9, the process A having a filter size of 7 ×7 and the process B having a filter size of 5×5 are selected as the filters to be used. In step S10, the size of a flanking area is calculated to be 12.

In step S11, a portrait image is captured. In step S12, the process B having a filter size of 5 ×5 and the process C having a filter size of 3×3 are selected as the filters to be used. In step S13, the size of a flanking area is calculated to be 8.

After the steps described above, in step S14, the CPU 40 controls the vertical copying unit 35a and the horizontal copying unit 35b such that a flanking area having the calculated size is provided. With this arrangement, image data having a flanking area of an appropriate size is generated and supplied to one or more filtering processes.

Figure 10:
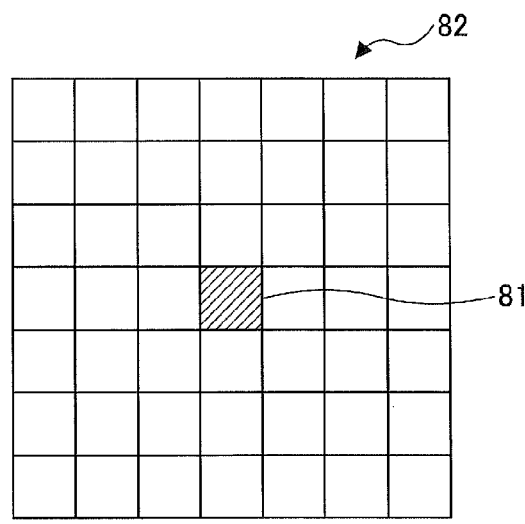
FIG. 10 is a drawing illustrating an example of a filter.

FIG. 10 is a drawing illustrating an example of a filter. The filter illustrated in FIG. 10 is a matrix 82 of 7 pixels by 7 pixels, with the 49 pixel positions thereof having respective weight coefficients assigned thereto. In order to obtain a filtered pixel value at the position of a center pixel 81, the pixel value of the center pixel 81 and the pixel values present in the areas each having a width of 3 pixels on the upper side, the lower side, the left side, and the right side of the center pixel 81 are used.

Figure 11:
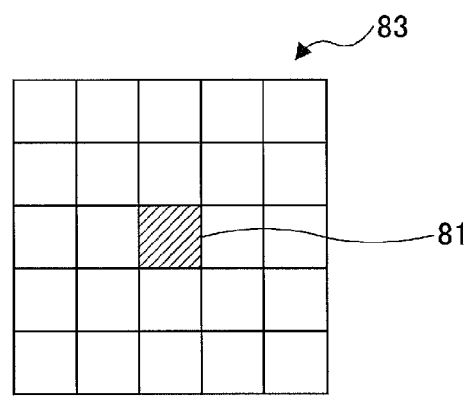
FIG. 11 is a drawing illustrating an example of a filter.

FIG. 11 is a drawing illustrating an example of a filter. The filter illustrated in FIG. 11 is a matrix 83 of 5 pixels by 5 pixels, with the 25 pixel positions thereof having respective weight coefficients assigned thereto. In order to obtain a filtered pixel value at the position of a center pixel 81, the pixel value of the center pixel 81 and the pixel values present in the areas each having a width of 2 pixels on the upper side, the lower side, the left side, and the right side of the center pixel 81 are used.

Figure 12:
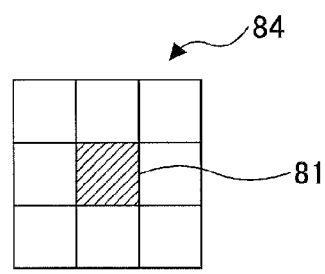
FIG. 12 is a drawing illustrating an example of a filter.

FIG. 12 is a drawing illustrating an example of a filter. The filter illustrated in FIG. 12 is a matrix 84 of 3 pixels by 3 pixels, with the 9 pixel positions thereof having respective weight coefficients assigned thereto. In order to obtain a filtered pixel value at the position of a center pixel 81, the pixel value of the center pixel 81 and the pixel values present in the areas each having a width of 1 pixel on the upper side, the lower side, the left side, and the right side of the center pixel 81 are used.

Figure 13:
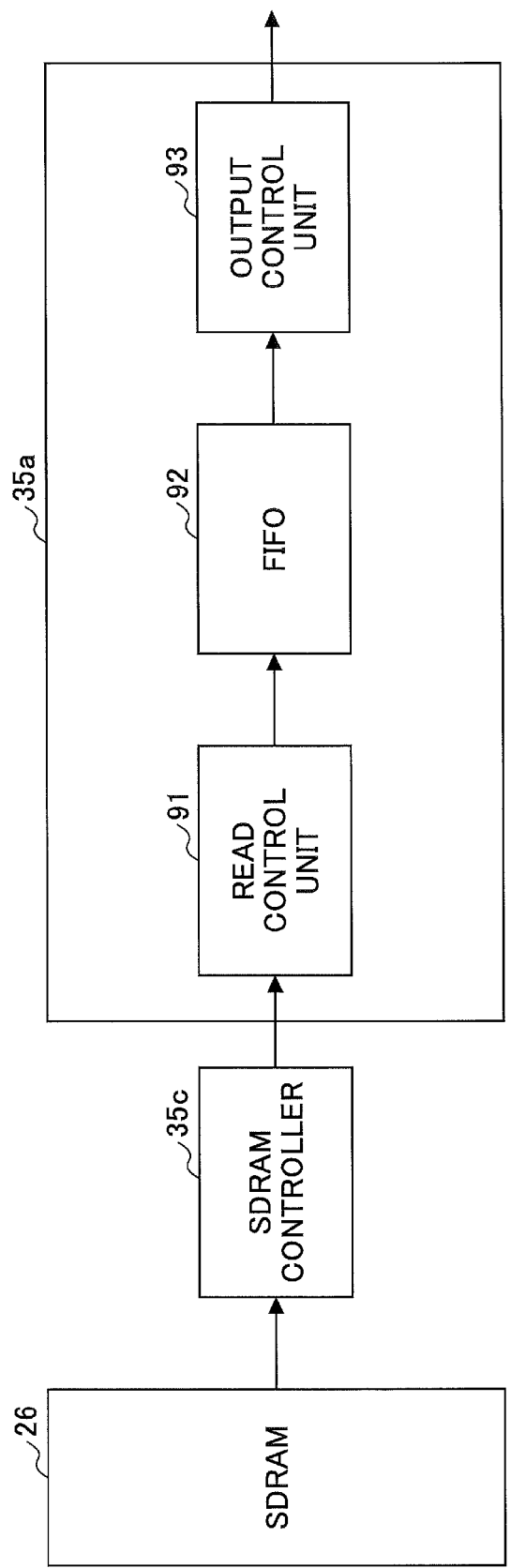
FIG. 13 is a drawing illustrating an example of the configuration of a vertical copying unit.

FIG. 13 is a drawing illustrating an example of the configuration of the vertical copying unit. The vertical copying unit 35a illustrated in FIG. 13 includes a read control unit 91, a FIFO (first-in first-out) 92, and an output control unit 93. An SDRAM controller 35c is part of the read unit 35, and controls a data read operation with respect to the SDRAM 26 under the control of the read control unit 91. The FIFO 92 stores data read from the SDRAM 26. The output control unit 93 successively reads data stored in the FIFO 92.

Figure 14:
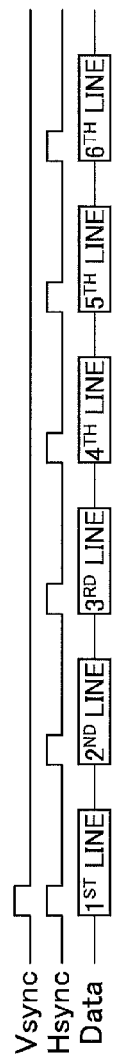
FIG. 14 is a drawing illustrating an example of the operation of the vertical copying unit.

FIG. 14 is a drawing illustrating an example of the operation of the vertical copying unit. In the example illustrated in FIG. 14, the vertical copying unit 35a successively reads the first line through the sixth line of image data in synchronization with a horizontal synchronizing signal Hsync that is synchronized with a vertical synchronizing signal Vsync. In this example, no copying operation for the purpose of setting pixel values to a flanking area is performed.

Figure 15:
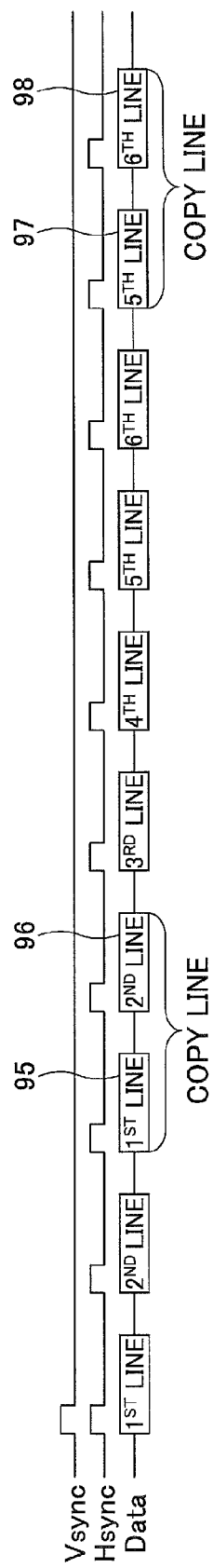
FIG. 15 is a drawing illustrating an example of the operation of the vertical copying unit.

FIG. 15 is a drawing illustrating an example of the operation of the vertical copying unit. In the example illustrated in FIG. 15, the vertical copying unit 35a successively reads each line of image data in synchronization with the horizontal synchronizing signal Hsync that is synchronized with the vertical synchronizing signal Vsync. In this example, the first line and the second line are read the first time from the SDRAM 26, and, then, the first line and the second line are read the second time from the SDRAM 26 as illustrated as copy lines 95 and 96. Moreover, the fifth line and the sixth line are read the first time from the SDRAM 26, and, then, the fifth line and the sixth line are read the second time from the SDRAM 26 as illustrated as copy lines 97 and 98. The image data of these copy lines may be used as the image data of a flanking area.

Figure 16:
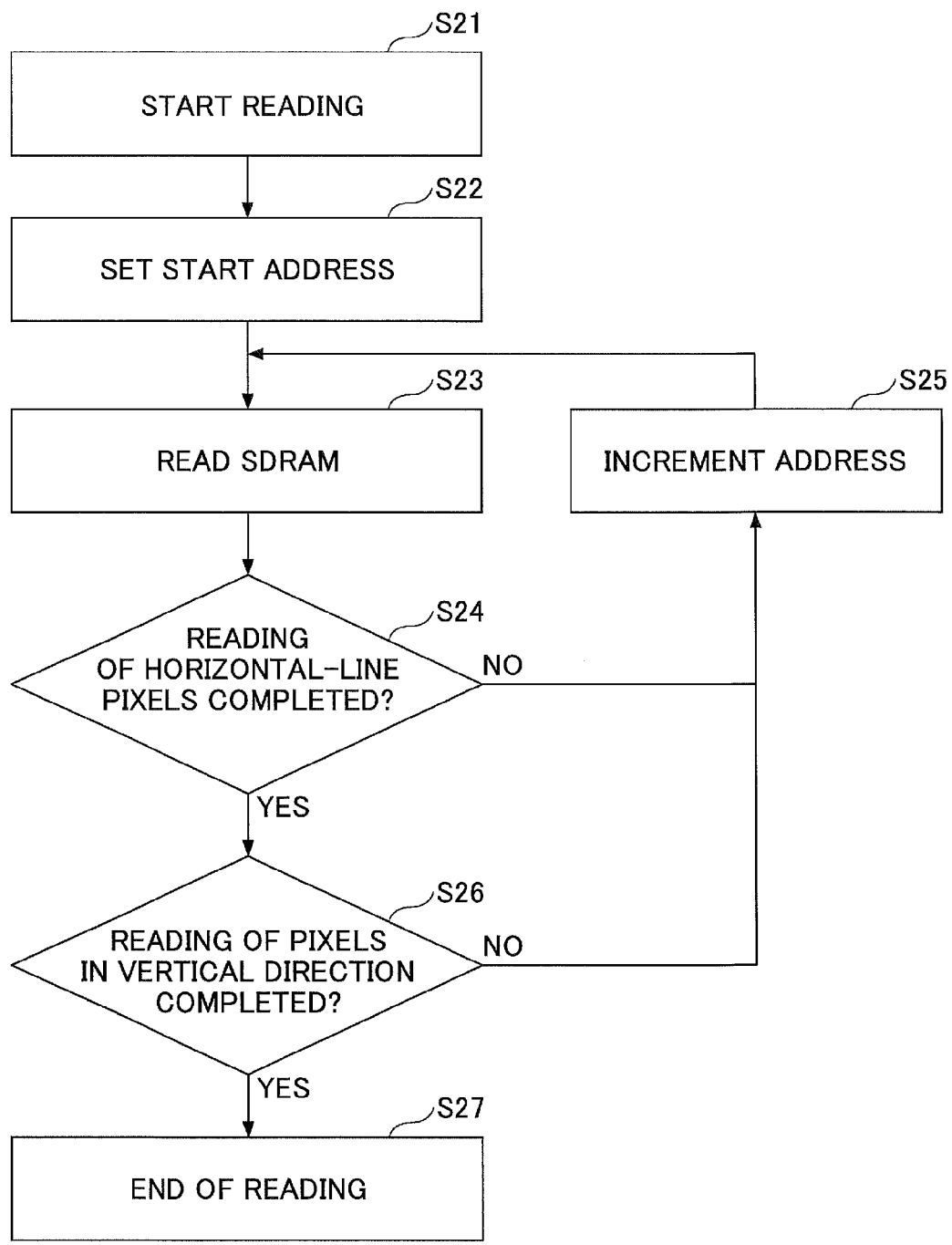
FIG. 16 is a flowchart illustrating an example of the operation of the vertical copying unit.

FIG. 16 is a flowchart illustrating an example of the operation of the vertical copying unit. Processes in the steps of this flowchart are performed by the SDRAM controller 35c under the control of the read control unit 91. This example corresponds to the read operation illustrated in FIG. 14, and no copying operation for the purpose of setting pixel values to a flanking area is performed.

In step S21, a read operation starts. In step S22, the read control unit 91 sets a start address. In step S23, the read control unit 91 uses the SDRAM controller 35c to read data from the SDRAM 26 at the address that is currently set. In step S24, the read control unit 91 checks whether a first process of reading all the pixels of one horizontal line is completed. If the first process is not completed, the address is incremented in step S25, and the procedure returns to step S23, followed by repeating the processes of step S23 and the subsequent steps. If the first process is completed, in step S26, the read control unit 91 checks whether a second process of reading image data for all the vertical pixels (i.e., reading image data of all the lines to be read) is completed. If the second process is not completed, the address is incremented in step S25, and the procedure returns to step S23, followed by repeating the processes of step S23 and the subsequent steps. If the second process is completed, the procedure comes to an end in step S27.

Figure 17:
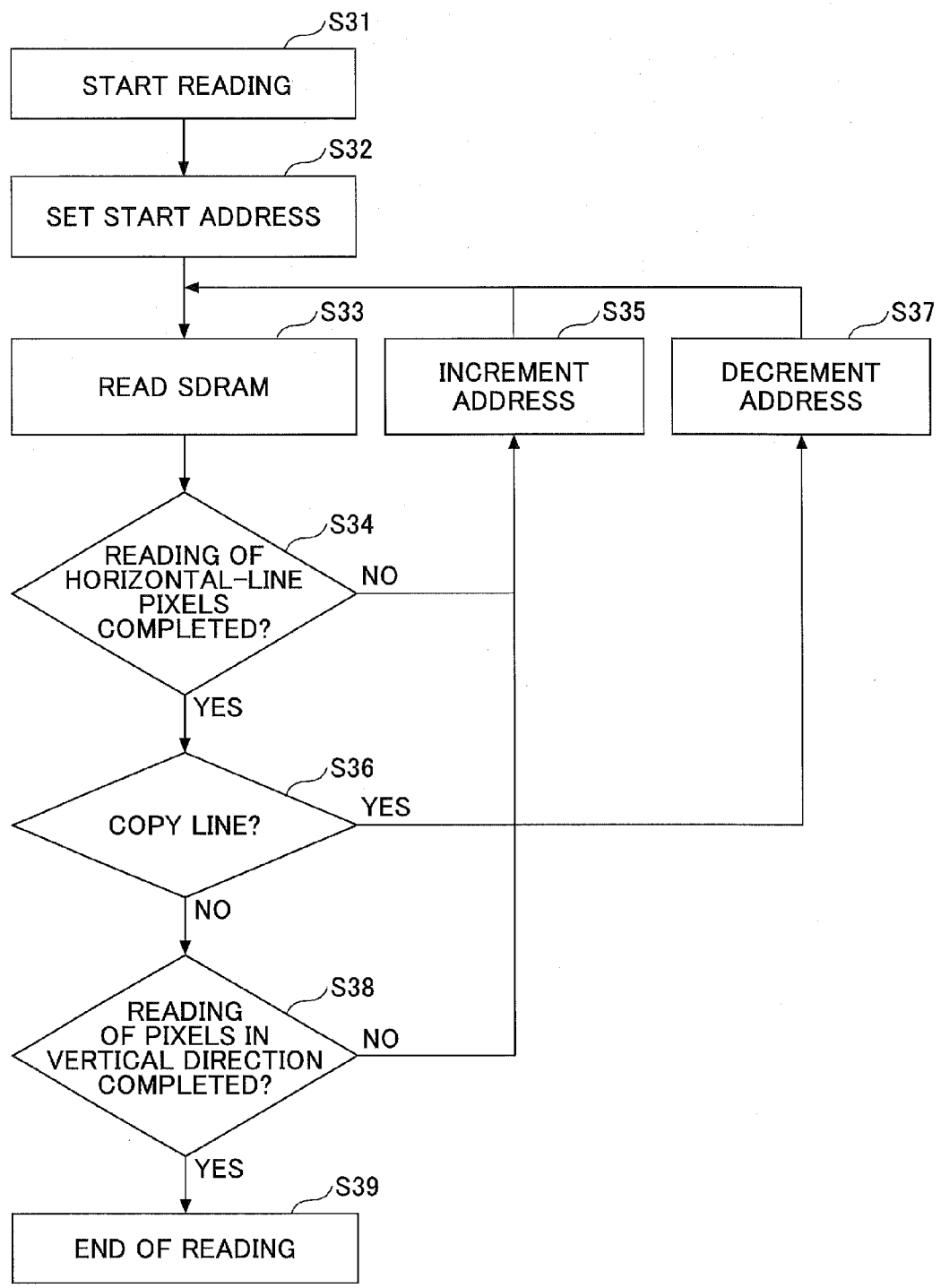
FIG. 17 is a flowchart illustrating an example of the operation of the vertical copying unit.

FIG. 17 is a flowchart illustrating an example of the operation of the vertical copying unit. Processes in the steps of this flowchart are performed by the SDRAM controller 35c under the control of the read control unit 91. This example corresponds to the read operation illustrated in FIG. 15, and a copying operation for the purpose of setting pixel values to a flanking area is performed.

In step S31, a read operation starts. In step S32, the read control unit 91 sets a start address. In step S33, the read control unit 91 uses the SDRAM controller 35c to read data from the SDRAM 26 at the address that is currently set. In step S34, the read control unit 91 checks whether a first process of reading all the pixels of one horizontal line is completed. If the first process is not completed, the address is incremented in step S35, and the procedure returns to step S33, followed by repeating the processes of step S33 and the subsequent steps. If the first process is completed, in step S36, the read control unit 91 checks whether the line that was most recently read is a line that is to be copied. If the last read line is a line to be copied, the address is decremented for one line in step S37, and the procedure returns to step S33, followed by repeating the processes of step S33 and the subsequent steps. If the last read line is not a line to be copied, in step S28, the read control unit 91 checks whether a second process of reading image data for all the vertical pixels (i.e., reading image data of all the lines to be read) is completed. If the second process is not completed, the address is incremented in step S35, and the procedure returns to step S33, followed by repeating the processes of step S33 and the subsequent steps. If the second process is completed, the procedure comes to an end in step S39.

In the manner described above, the read unit 35 reads the pixel values of the same pixels multiple times from the SDRAM 26, and utilizes the pixel values obtained in one of the multiple read operations as the pixel values of the rectangular area. The read unit 35 further utilizes the pixel values obtained in another one of the multiple read operations as the pixel values of the flanking area.

FIG. 18 is a drawing illustrating an example of the configuration of the horizontal copying unit. The horizontal copying unit 35b illustrated in FIG. 18 includes a buffer 101, a selector 102, and an output unit 103. The buffer 101 stores image data output from the vertical copying unit 35a successively on a pixel-by-pixel basis. With this arrangement, the buffer 101 delays the image data including a series of pixel values read from the SDRAM 26 and supplied via the vertical copying unit 35a. The selector 102 successively selects a pixel value either from a series of delayed pixel values supplied from the buffer 101 or from a series of pixel values that are not delayed, thereby setting the pixel value of the same pixel both in the inside of the rectangular area and in the flanking area. The output unit 103 outputs the image data supplied from the selector 102.

FIG. 19 is a drawing illustrating an example of the operation of the horizontal copying unit. In the example illustrated in FIG. 19, the horizontal copying unit 35b successively outputs the pixel value data of each horizontal line in synchronization with a clock signal Clock that is synchronized with the horizontal synchronizing signal Hsync. In this example, no copying operation for the purpose of setting pixel values to a flanking area is performed. It may be noted that pixel values used in this example are those of a Bayer array.

FIG. 20 is a drawing illustrating an example of the operation of the horizontal copying unit. In the example illustrated in FIG. 20, the horizontal copying unit 35b successively outputs the pixel value data of each horizontal line in synchronization with the clock signal Clock that is synchronized with the horizontal synchronizing signal Hsync. In this example, the pixel values of the same pixels are output in duplicate in different clock cycles, thereby generating copied pixel values 104 through 109 that are the same as the pixel values output at other timings. The detail of this operation will be described in the following.

Figure 21:
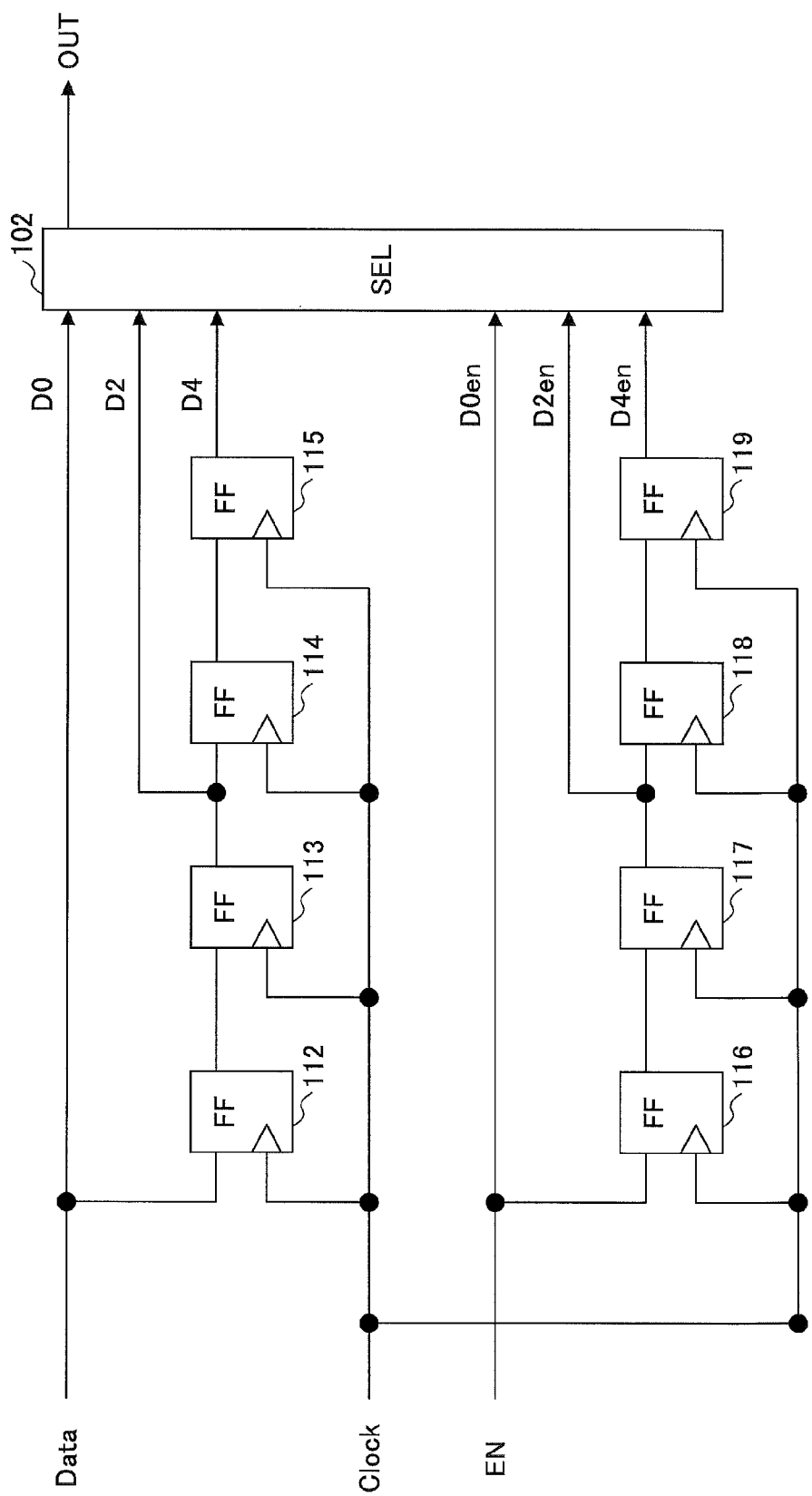
FIG. 21 is a drawing illustrating an example of the buffer of the horizontal copying unit.

FIG. 21 is a drawing illustrating an example of the buffer of the horizontal copying unit. The buffer 101 illustrated in FIG. 21 includes flip-flops (FF) 112 through 119. Each of the flip-flops receives the clock signal Clock at the clock input thereof. The flip-flops 112 through 115 are connected in series, and allow a data signal Data indicative of successive pixel values to propagate therethrough in synchronization with the clock signal Clock. The flip-flops 112 through 115 generate data D0 having no delay, data D2 having a two cycle delay, and data D4 having a four cycle delay. The flip-flops 116 through 119 are connected in series, and allow an enable signal EN to propagate therethrough in synchronization with the clock signal Clock. The flip-flops 116 through 119 generate an enable signal D0en having no delay, an enable signal D2en having a two cycle delay, and an enable signal D4en having a four cycle delay.

The selector 102 selects the data D2 having a two cycle delay in the case of the enable signal D2en being HIGH. The selector 102 selects the data D0 having no delay in the case of the enable signal D2en being LOW when the enable signal D0en is HIGH. The selector 102 selects the data D4 having a four cycle delay in the case of the enable signal D2en being LOW when the enable signal D4en is HIGH.

Figure 22:
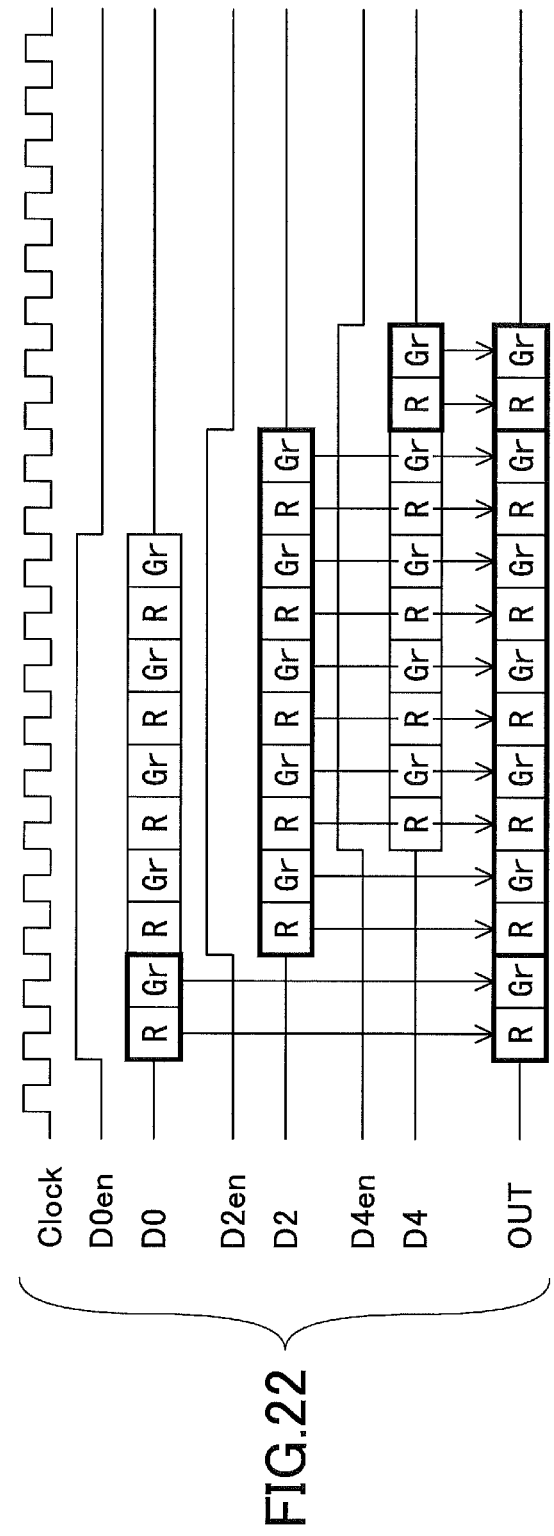
FIG. 22 is a drawing illustrating an example of the operation of the circuit illustrated in FIG. 21.

FIG. 22 is a drawing illustrating an example of the operation of the circuit illustrated in FIG. 21. As described above, the selector 102 selects the data D0 having no delay, the data D2 having a two cycle delay, or the data D4 having a four cycle delay in response to the enable signals D0en, D2en, and D4en, followed by outputting the selected data. As a result, pixel data as illustrated in FIG. 22 as an output signal OUT is produced as an output. In the output signal OUT, the first two pixels are the copies of the two immediately succeeding pixels, and the last two pixels are the copies of the two immediately preceding pixels. These copied pixels may constitute the pixels of a flanking area.

According to at least one embodiment, an image processing apparatus is provided in which simple control regarding the positional relationship between a rectangular area and a flanking area suffices when performing a filtering process with respect to rectangular areas obtained by dividing the entire image data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. An image processing apparatus, comprising:
a memory circuit configured to store original image data;
a read circuit configured to:
read, from the memory circuit, image data of a rectangular area that is part of the original image data,
set pixel values to a first flanking area that is added to the rectangular area in a surrounding space thereof such that the first flanking area adjoins one or more edges of the rectangular area that are part of perimeter edges of the original image data, and
output extended image data inclusive of the image data of the rectangular area, image data of the first flanking area to which the pixel values are set, and image data of a second flanking area that is image data of adjacent areas added to the rectangular area in a surrounding space thereof such that the second flanking area adjoins one or more edges of the rectangular area that are not part of the perimeter edges of the original image data; and
a first filtering process circuit configured to apply a filtering process to the extended image data.
2. The image processing apparatus as claimed in claim 1, wherein the read circuit is further configured to set the pixel values to the flanking areas by setting, to the first flanking area, pixel values identical to pixel values that are in existence inside the rectangular area.

3. The image processing apparatus as claimed in claim 2, wherein the read circuit is further configured to perform multiple read operations to read pixel values of the same pixels multiple times from the memory circuit, to use the pixel values obtained in one of the multiple read operations as the pixel values of the rectangular area, and to use the pixel values obtained in another one of the multiple read operations as the pixel values of the first flanking area.

4. The image processing apparatus as claimed in claim 2, wherein the read circuit is further configured to successively read a series of pixel values from the memory unit, to delay the series of pixel values, and to successively select a pixel value from either the delayed series of pixel values or the series of pixel values with no delay, thereby setting the pixel value of the same pixel both to an inside of the rectangular area and to the first flanking area.

5. The image processing apparatus as claimed in claim 1, wherein the read circuit is further configured to:

successively read image data of all rectangular areas included in the original image data, to write the extended image data of a first rectangular area at a position corresponding to the first rectangular area in the memory circuit when the first rectangular area is in contact with a perimeter edge of the original image data, and to write the image data of a second rectangular area, as is read from the memory circuit, at a position corresponding to the second rectangular area in the memory unit when the second rectangular area is not in contact with any perimeter edge of the original image data, and read image data of an extended rectangular area that includes the image data of a given rectangular area written to the memory by the read unit and the image data of an area having a constant size situated in surroundings of the given rectangular area, and the filtering process circuit is further configured to apply the filtering process to the image data of the extended rectangular area.

6. The image processing apparatus as claimed in claim 1, further comprising a second filtering process circuit, wherein the first filtering process circuit is further configured to apply a filtering process having a first filter size to the extended image data, and the second filtering process circuit is further configured to apply a filtering process having a second filter size to image data output from the first filtering process circuit, wherein the read circuit is further configured to output the extended image data obtained by setting the pixel values to the first flanking area having a size larger than a size corresponding to a sum of the first filter size and the second filter size, and the first filtering process circuit is further configured to output image data having the same size as the rectangular area surrounded by a flanking area that has a size larger than a size corresponding to the second filter size.

7. An imaging apparatus, comprising:
a lens;
an imaging device; and
an image processing unit,
wherein the image processing unit includes:
a memory circuit configured to store original image data;
a read circuit configured to:
read, from the memory unit, image data of a rectangular area that is part of the original image data, to set pixel values to a first flanking area that is added to the rectangular area in a surrounding space thereof such that the first flanking area adjoins one or more edges of the rectangular area that are part of perimeter edges of the original image data, and output extended image data inclusive of the image data of the rectangular area, image data of the first flanking area to which the pixel values are set, and image data of a second flanking area that is image data of adjacent areas added to the rectangular area in a surrounding space thereof such that the second flanking area adjoins one or more edges of the rectangular area that are not part of the perimeter edges of the original image data; and a filtering process circuit configured to apply a filtering process to the extended image data.

8. A method for processing an image, comprising:
using a read circuit to read, from a memory circuits that stores original image data, image data of a rectangular area that is part of the original image data;
using the read circuit to set pixel values to a first flanking area that is added to the rectangular area in a surrounding space thereof such that the first flanking area adjoins one or more edges of the rectangular area that are part of perimeter edges of the original image data;
using the read circuit to produce extended image data inclusive of the image data of the rectangular area and image data of the first flanking area to which the pixel values are set, and image data of a second flanking area that is image data of adjacent areas added to the rectangular area in a surrounding space thereof such that the second flanking area adjoins one or more edges of the rectangular area that are not part of the perimeter edges of the original image data;
supplying the extended image data to a filtering process circuit; and
using the filtering process circuit to apply a filtering process to the extended image data.

* * * * *